No. 783,530. PATENTED FEB. 28, 1905.
W. H. LAMONT.
ANTIKICKING DEVICE FOR COWS.
APPLICATION FILED APR. 20, 1904.

Witnesses
H. H. Hunt
F. A. Gould

Inventor
William H. Lamont,
By Walter N. Haskell,
Attorney

No. 783,530. Patented February 28, 1905.

UNITED STATES PATENT OFFICE.

WILLIAM H. LAMONT, OF PROPHETSTOWN, ILLINOIS.

ANTIKICKING DEVICE FOR COWS.

SPECIFICATION forming part of Letters Patent No. 783,530, dated February 28, 1905.

Application filed April 20, 1904. Serial No. 204,142.

*To all whom it may concern:*

Be it known that I, WILLIAM H. LAMONT, a citizen of the United States, residing at Prophetstown, in the county of Whiteside and State of Illinois, have invented certain new and useful Improvements in Antikicking Devices for Cows; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention has reference to devices for preventing the kicking of a cow while the operation of milking is in process, and is designed to be secured to the limbs of the animal in such manner as to discourage any inclination on the part of the animal to unnecessarily exercise its hind legs.

Figure 1:
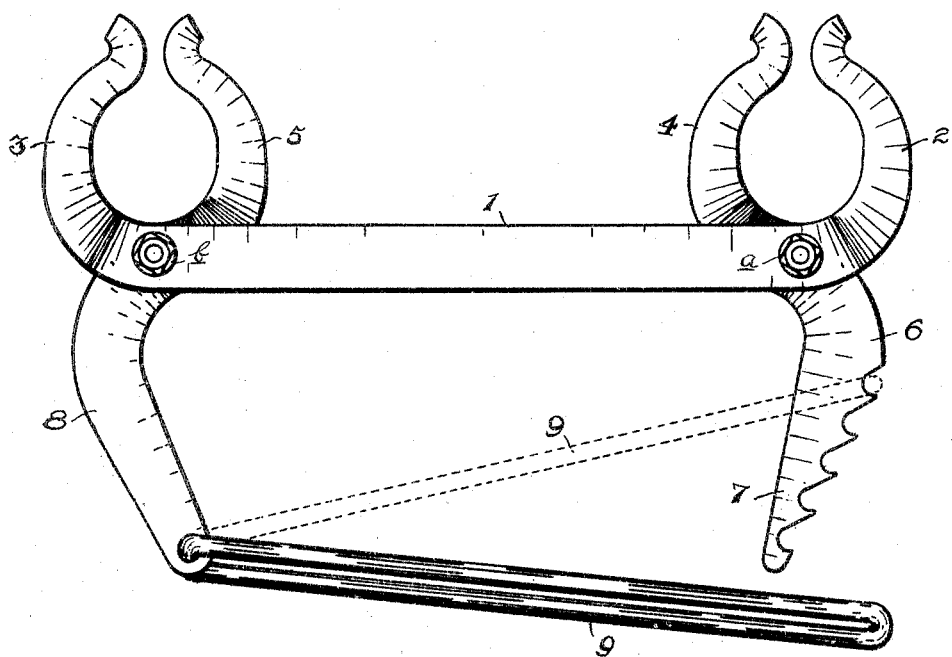
Figure 2:
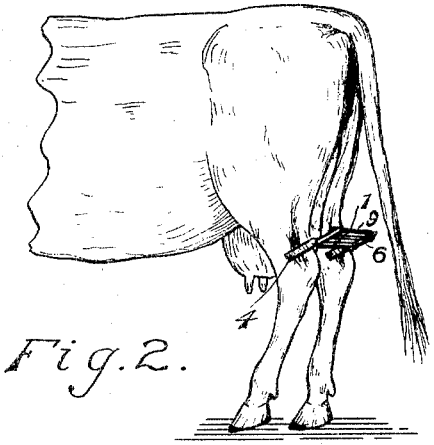

In the drawings, Figure 1 is a plan view of my device. Fig. 2 shows the same in perspective as applied to the animal.

1 represents a metal bar of desired strength provided at its ends with the semicircular stationary jaws 2 and 3, such jaws being integral with the bar 1. Pivotally secured to the bar 1, as at $a$, is a semicircular jaw 4 in opposition to the jaw 2. A similar jaw 5, in opposition to the jaw 3, is pivotally secured to the bar 1, as at $b$.

The movable jaw 4 is projected in rear of the bar 1 into the arm 6, ending in a ratchet-cam 7. The jaw 5 is similarly extended into an arm 8, to the end of which is loosely secured the link 9. The free end of the link 9 is adapted to clasp the cam 7 and engage the ratchet-teeth thereof.

In use the device is secured to the hind limbs of the animal immediately above the hock-joints, as shown in Fig. 2, the pairs of jaws being adapted to embrace the large cords extending upwardly from the hock-joints in rear of the limbs. To secure in place, one of the legs is engaged by the jaws 2 and 4 and the arm 6 operated to cause the cord of the limb to be snugly embraced by such jaws. The jaws 3 and 5 are then caused to engage the other leg of the animal at the point indicated and the arm 8 operated in the direction of the arm 6 until the cord of the other leg is snugly grasped by such last-named jaws. The link 9 is then slipped over the cam 7 until it is firmly engaged by one of the ratchets thereon, as shown in dotted lines. By this means the movable jaws 4 and 5 are both locked from movement. By the diagonal arrangement of the teeth upon the cam 7 the space between the jaws 2 and 4 and between the jaws 3 and 5 can be regulated, so that such jaws may conform to legs or cords of varying dimensions.

When in position on the animal, as shown in Fig. 2, it is impossible for one leg to be used independently of the other and any attempt at kicking is entirely prevented. At the same time there is no hindrance to the movement of the lower part of the limbs, and sufficient change of position is permitted to the animal to prevent restlessness.

The device is easily removed by drawing the arms 6 and 8 toward each other sufficiently to release the link 9.

What I claim as my invention, and desire to secure by Letters Patent of the United States, is—

1. An improved antikicking device, comprising a pair of stationary jaws, connected by a stationary bar, a pair of movable jaws, one each thereof being in opposition to one each of such stationary jaws, and means for locking such movable jaws with their ends in proximity to the ends of said stationary jaws, substantially as set forth.

2. An improved antikicking device comprising a pair of stationary jaws, connected by a stationary bar; a pair of movable jaws, one each thereof being in opposition to one each of the stationary jaws, and means for adjustably locking such movable jaws with their ends in proximity to the ends of said stationary jaws, substantially as shown.

3. In an antikicking device the combination of the bar 1; the stationary jaws 2 and 3, integral therewith; the movable jaws 4 and 5, the arm 6, projected from the jaw 4; the arm 8, projected from the arm 5; and means for connecting the arms 6 and 8 to prevent movement of the jaws 4 and 5 when the ends of such jaws are in proximity to the ends of the jaws 2 and 3; substantially as shown and described.

4. In an antikicking device the combination of the stationary bar 1; the stationary jaws 2 and 3, integral therewith; the movable jaws 4 and 5; the arm 6, projected from the jaw 4, and provided with the ratchet-cam 7; the arm 8, projected from the jaw 5, and the link 9, attached to the end of the arm 8, and adapted to engage the cam 7, substantially as shown and set forth.

In testimony whereof I affix my signature in presence of two witnesses.

WILLIAM H. LAMONT.

Witnesses:
  C. G. Hill,
  Henry Lancaster.